T. H. HOLLIS.
GAS AND AIR MIXER.
APPLICATION FILED JUNE 2, 1913.
1,112,066.
Patented Sept. 29, 1914.
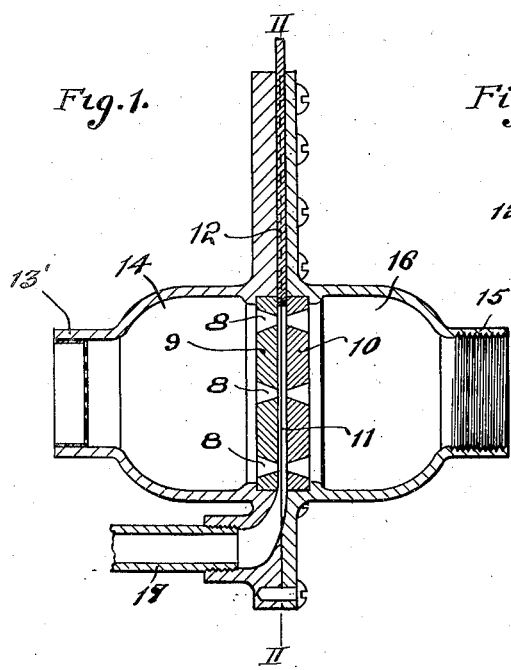
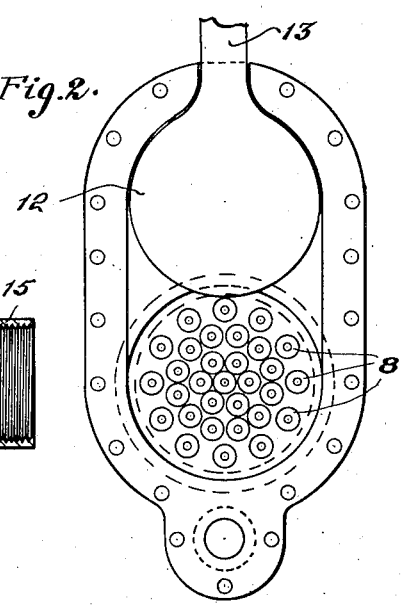
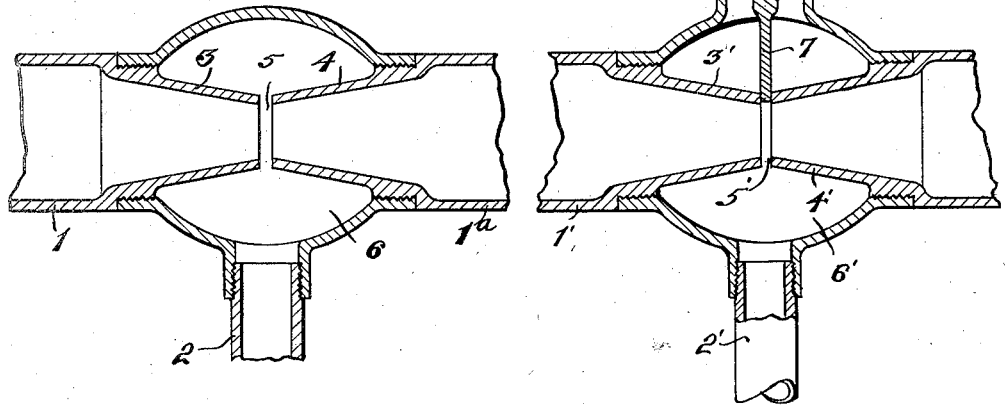
WITNESSES
INVENTOR
Thomas H. Hollis

UNITED STATES PATENT OFFICE.

THOMAS H. HOLLIS, OF PITTSBURGH, PENNSYLVANIA.

GAS AND AIR MIXER.

1,112,066. Specification of Letters Patent. Patented Sept. 29, 1914.

Application filed June 2, 1913. Serial No. 771,171.

*To all whom it may concern:*

Be it known that I, THOMAS H. HOLLIS, a citizen of the United States, residing at Pittsburgh, in the county of Allegheny and State of Pennsylvania, have invented certain new and useful Improvements in Gas and Air Mixers, of which the following is a specification.

The invention relates to gas and air mixers for use with explosion motors, and has for its primary objects, the provision of a simplified form of gas and air mixers in which the proper proportion of gas to air is maintained under all conditions of service; the provision of a device in which the actuation of the governor to increase or decrease the quantity of explosive mixture supplied to the motor does not materially alter the relative proportions of gas and air; and the provision of a mixer capable of general application, of cheap construction, and one not liable to get out of order. Certain embodiments of the invention are illustrated in the accompanying drawing, wherein—

Figure 1 is a transverse section through the mixer; Fig. 2 is a section taken on the line II—II of Fig. 1; Fig. 3 is a transverse section through a modified form of mixer; and Fig. 4 is a transverse section through still another form of mixer differing slightly from the construction of Fig. 3.

The principle of the invention will be most easily understood by referring first to the construction of Fig. 3 which is much simpler than that of the preferred structure of Figs. 1 and 2. In this construction of Fig. 3, 1 is an air supply conduit leading to the mixer, 1ª is a conduit leading from the mixer to the cylinder of an explosion motor or other device with which the mixer is used; 2 is a gas supply pipe; 3 and 4 are nozzles located in the conduit 1 and having their reduced ends in alinement opposing each other but spaced apart to provide a gas inlet port 5; and 6 is a gas chamber surrounding the ends of the nozzles 3 and 4, so that gas may be supplied to the port 5 from all sides.

When air is drawn through the conduit 1, a relatively high velocity is secured at the reduced portions of the nozzles, and the air flowing past the port 5 at this relatively high velocity entrains gas from the chamber 6, thus forming an explosive mixture which is carried to the cylinder of the engine.

The construction of Fig. 4 is the same as that of Fig. 3, with the exception that the regulating valve 7 is provided which moves transversely of the axes of the nozzles 3' and 4', and serves to regulate the quantity of the explosive mixture, the valve serving not only to cut down the amount of air flowing through the nozzles, but also the amount of gas flowing to the port 5'. The valve 7 of disk form may be controlled by any desired form of governor, or may be controlled by hand. The parts 1', 2', and 6' are substantially the same as the parts 1, 2, and 6 of Fig. 3.

The preferred form of mixer as illustrated in Figs. 1 and 2 is very similar in principle to the construction of Fig. 4, with the exception that instead of a single pair of nozzles, a large number of pairs 8—8—8, etc., are provided. These nozzles are preferably formed by boring conical recesses into the opposing plates 9 and 10, such opposing plates being separated by the space 11. Working in the space 11 is the controlling valve 12, which valve is controlled by a governor (not shown) connected to the stem 13. 13' is the air supply conduit leading to the mixer and expanded into the chamber 14, and 15 is the conduit leading to the engine connected from the chamber 16 corresponding in shape to the chamber 14. The space 11 constitutes a gas supply chamber, so that the reduced end of each valve nozzle is surrounded by a supply of gas, gas being supplied to this chamber by means of the gas supply conduit 17. A pressure regulator of any desired type may be employed with the apparatus in order to prevent a flow of gas to the mixer when the engine or other apparatus with which the mixer is employed is not in operation.

While I preferably employ the tapering nozzles illustrated, it will be understood that the term nozzle is used in its broad sense and that the invention is not limited to the use of tapering nozzles.

What I claim is:

1. In combination in a gas and air mixer, an air supply conduit, a pair of tapering nozzles in the conduit with their contracted ends opposing each other in alinement but spaced apart, a gas supply chamber surrounding the said opposing ends and communicating with the space between the ends of the nozzles, a gas supply conduit connected to said chamber, and a valve fitting the space between the ends of the nozzles and movable transversely of the axes of the nozzles.

2. In combination in a gas and air mixer, an air supply conduit, a plurality of pairs of tapering nozzles in the conduit side by side with the contracted ends of each pair in opposition but spaced apart, a gas supply chamber surrounding the said opposing ends, a valve fitting in the space between the said opposing ends and movable transversely of the axes of the nozzles, and a gas conduit connected to the said chamber.

3. In combination in a gas and air mixer, an air supply conduit, a pair of nozzles in the conduit with their ends opposing each other in alinement but spaced apart, a gas supply chamber surrounding the said opposing ends and communicating with the space between the ends of the nozzles, a gas supply conduit connected to said chamber, and a valve fitting the space between the ends of the nozzles and movable transversely of the axes of the nozzles.

4. In combination in a gas and air mixer, an air supply conduit, a plurality of pairs of nozzles in the conduit side by side with the ends of each pair in opposition but spaced apart, a gas supply chamber surrounding the said opposing ends, a valve fitting in the space between the said opposing ends and movable transversely of the axes of the nozzles, and a gas conduit connected to the said chamber.

In testimony whereof I have hereunto signed my name in the presence of the two subscribed witnesses.

THOS. H. HOLLIS.

Witnesses:
ARCHWORTH MARTIN,
LETITIA A. MYERS.